(12) United States Patent
Hon et al.

(10) Patent No.: US 8,225,519 B2
(45) Date of Patent: Jul. 24, 2012

(54) CONTACT TYPE MEASUREMENT DEVICE HAVING FINE CONTACT FORCE ADJUSTMENT MECHANISM

(75) Inventors: Yonpyo Hon, Yamanashi (JP); Kenzo Ebihara, Yamanashi (JP); Masayuki Hamura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/033,927

(22) Filed: Feb. 24, 2011

(65) Prior Publication Data

US 2011/0232118 A1  Sep. 29, 2011

(30) Foreign Application Priority Data

Mar. 25, 2010 (JP) ................................. 2010-070837

(51) Int. Cl.
*G01B 5/00* (2006.01)
*G01B 7/00* (2006.01)
*G01B 13/00* (2006.01)

(52) U.S. Cl. .......................................... 33/559; 33/556

(58) Field of Classification Search .................... 33/559, 33/503, 556, 558, 561
See application file for complete search history.

(56) References Cited

U.S. PATENT DOCUMENTS

| | | | | |
|---|---|---|---|---|
| 3,578,746 A * | 5/1971 | Walker | ............................ | 33/559 |
| 4,507,868 A * | 4/1985 | Tuss | ................ | 33/1 M |
| 4,860,755 A * | 8/1989 | Erath | ............................ | 600/405 |
| 4,949,465 A * | 8/1990 | Pesikov | ........................ | 33/1 M |
| 5,005,297 A * | 4/1991 | Aehnelt et al. | ................... | 33/559 |
| 5,018,278 A * | 5/1991 | Aehnelt et al. | ................... | 33/559 |
| 5,208,994 A * | 5/1993 | McMurtry et al. | .............. | 33/561 |
| 6,701,633 B2 * | 3/2004 | Ohtsuka | .......................... | 33/552 |
| 6,886,265 B2 * | 5/2005 | Fracheboud et al. | ........... | 33/559 |
| 7,353,616 B2 | 4/2008 | Matsumoto et al. | | |
| 7,685,733 B2 | 3/2010 | Ohmori et al. | | |
| 7,797,850 B2 * | 9/2010 | Hon et al. | ........................ | 33/559 |
| 2009/0235397 A1 | 9/2009 | Hon et al. | | |
| 2010/0030368 A1 | 2/2010 | Hon et al. | | |

FOREIGN PATENT DOCUMENTS

| | | |
|---|---|---|
| JP | 62-140002 A | 6/1987 |
| JP | 5-126556 A | 5/1993 |
| JP | 11-316119 A | 11/1999 |
| JP | 2005-315780 A | 11/2005 |
| JP | 2006-098060 A | 4/2006 |

(Continued)

OTHER PUBLICATIONS

Japanese Office Action 2010-070837 issued Aug. 16, 2011.

(Continued)

*Primary Examiner* — Christopher Fulton
(74) *Attorney, Agent, or Firm* — Lowe Hauptman Ham & Berner LLP

(57) ABSTRACT

A contact type measurement device performs measurement with displacement of a probe, while a contact member attached to the probe is in contact with an object to be measured. Data on the relationship of a contact force of the probe to the object to be measured with an angle between the central axis of the probe and the direction of gravity, the amount of displacement of the probe, and a fluid pressure for applying a pushing-out or pulling-in force to the probe is stored in advance and, on the basis of this data, the fluid pressure or the amount of displacement of the probe is controlled to automatically and precisely adjust a fine contact force of the probe to the object to be measured.

4 Claims, 9 Drawing Sheets

FOREIGN PATENT DOCUMENTS

| | | |
|---|---|---|
| JP | 2007155440 | 6/2007 |
| JP | 2008203191 | 9/2008 |
| JP | 2009216667 | 9/2009 |
| JP | 2010032373 A | 2/2010 |
| KR | 20060122743 A1 | 11/2006 |

OTHER PUBLICATIONS

Japanese Office Action for 2010-070837 mailed May 31, 2011.
Korean Office Action for 2011-0018445 mailed Apr. 17, 2012.

* cited by examiner

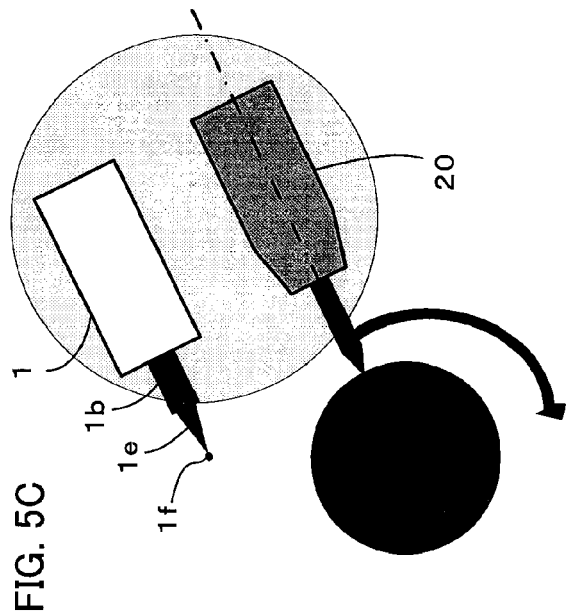
FIG. 5C
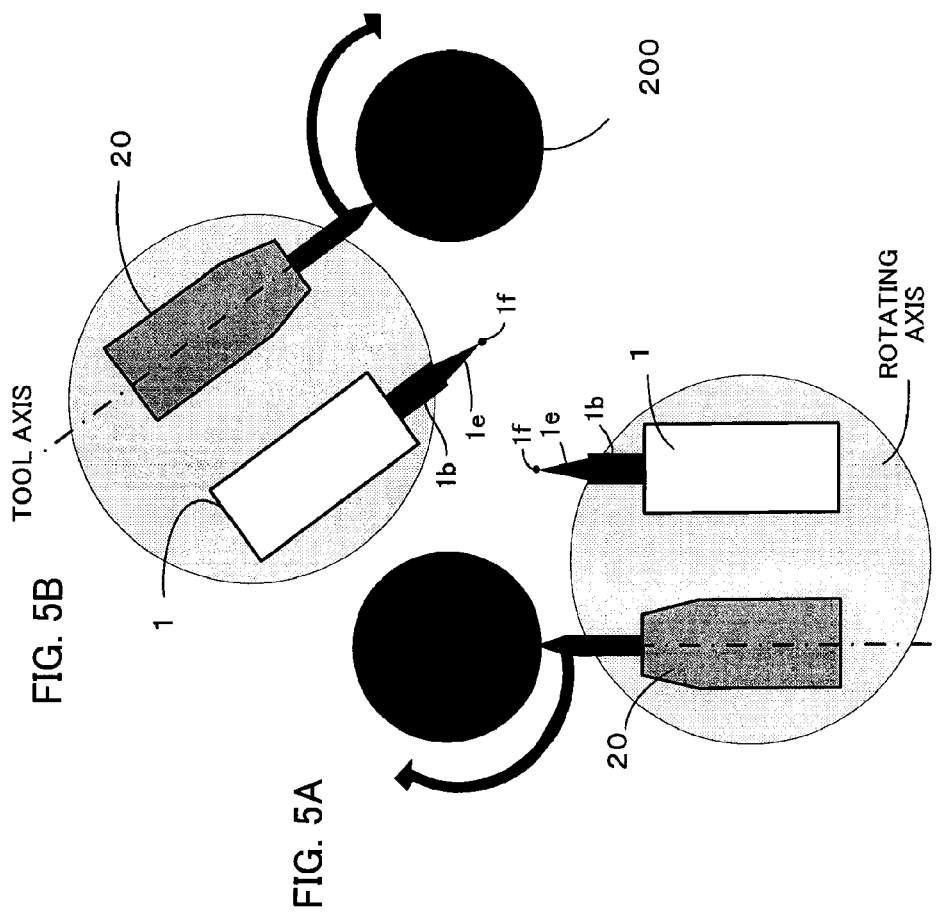
FIG. 5B
FIG. 5A

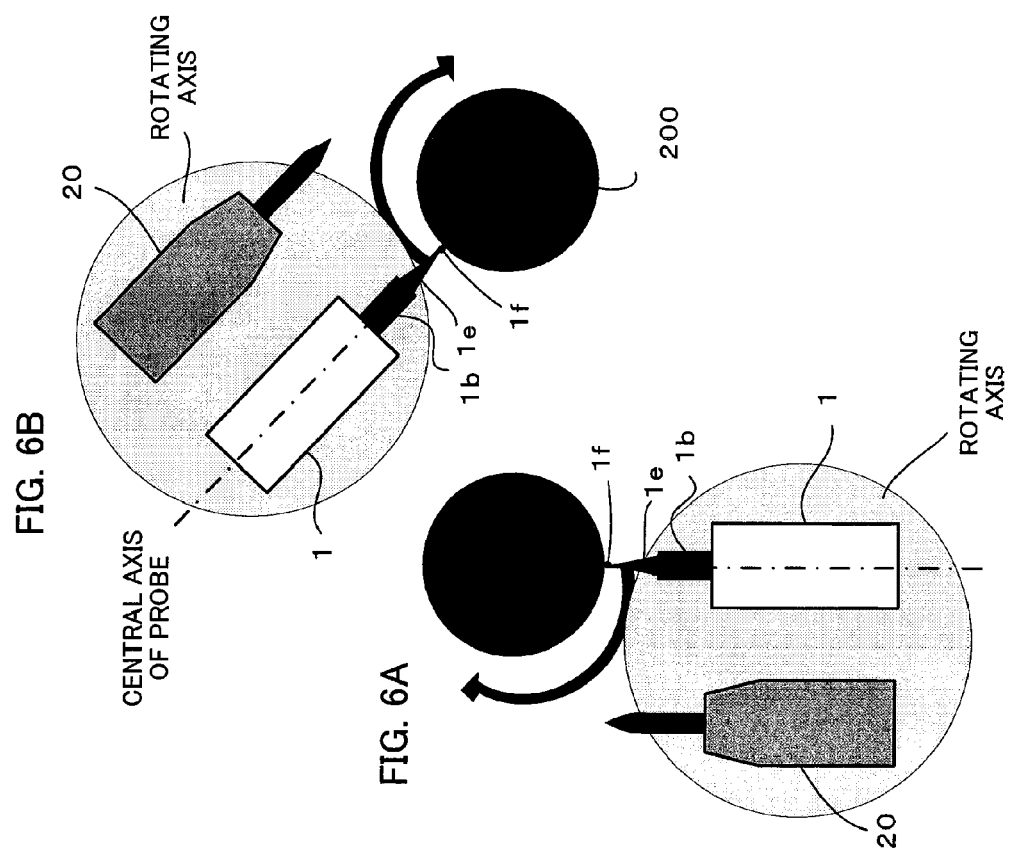

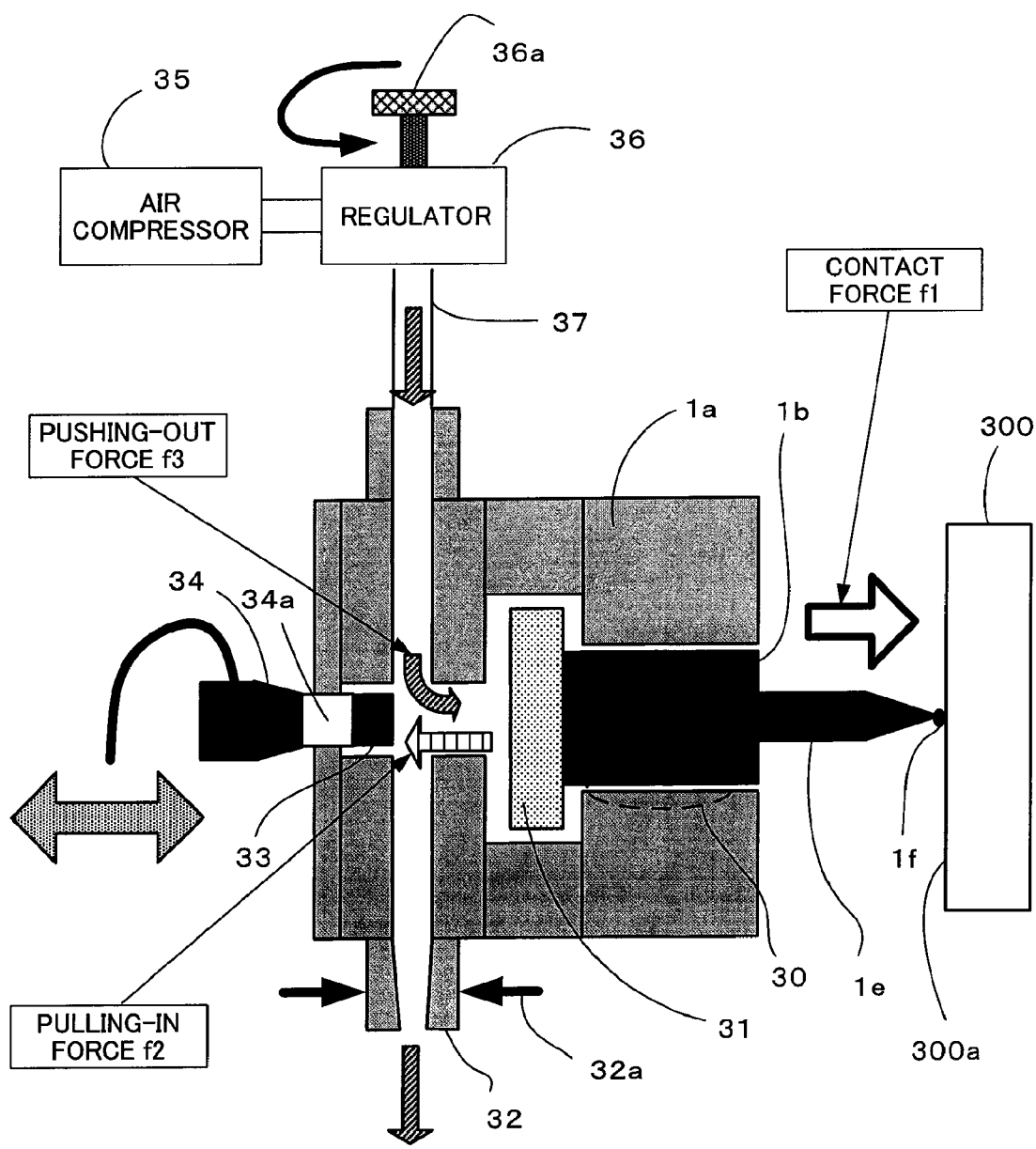

CONTACT TYPE MEASUREMENT DEVICE HAVING FINE CONTACT FORCE ADJUSTMENT MECHANISM

RELATED APPLICATIONS

The present application is based on, and claims priority from, Japanese Application Number 2010-070837, filed Mar. 25, 2010, the disclosure of which is hereby incorporated by reference herein in its entirety.

BACKGROUND OF THE INVENTION

1. Field of the Invention

The present invention relates to a contact type measurement device having a fine contact force adjustment mechanism.

2. Description of the Related Art

To achieve a high shape accuracy at the nanometer level in ultraprecision machining with a machine tool, it is necessary to perform machining while making corrections on the basis of the results of measurement performed with an on-machine measuring device mounted on the tool. In a contact type measurement device having a probe to be brought into contact with the object to be measured for measurement, it is necessary to adjust the contact force of the probe depending on the moving speed of the probe, as well as on the shape and material of the object to be measured. If the probe is vertically mounted, the effect of the own weight of the probe should be eliminated to achieve a fine contact force.

U.S. Patent Application Publication No. U.S. 2009/0235397 A1 discloses a technique for fine adjustment of the contact force of a probe to achieve a fine contact force with use of permanent magnets and a compressed air pressure. U.S. Pat. No. 7,685,733 discloses a technique for adjusting the contact force of a probe with use of many pressing spaces provided in the probe bearing so that the direction of the pressing force varies with the compressed air supplied into the spaces. More specifically, the contact force increases when the pressing force is applied by the compressed air in the direction of pushing out the probe, while the own weight of the probe is cancelled out when the pressing force is applied in the direction of pulling in the probe.

FIG. 11 schematically illustrates a contact type measurement device serving as the on-machine measuring device for fine contact force adjustment disclosed in the above U.S. 2009/0235397 A1. This on-machine measuring device has a friction-free probe supported by a fluid bearing. The contact force to the surface to be measured by the probe is finely adjusted by balancing the air pressure to the pressure receiving surface and the attractive force of the permanent magnet to the magnetic material.

As shown in FIG. 11, the probe body 1a is equipped with a mechanical wear-free probe 1b supported by a fluid bearing (fluid bearing surface 30). The contact force f1 of the probe 1b to the surface to be measured 300a of a contact force measuring device 300 can be finely adjusted by adjusting the pressure of the air supplied to the probe 1b with a regulator 36 and an exhaust valve 32a and by adjusting the attractive force of the permanent magnet 33 to the magnetic material 31 while a spherical measuring member if attached to the front end of a measuring shaft 1e is in contact with the contact force measuring device 300. The contact force measuring device 300 may be a force sensor or an electronic balance, for example.

To vary the contact force of the probe 1b using the technique disclosed in the above U.S. 2009/0235397 A1, however, it is necessary to finely adjust the air pressure (pressure of the compressed air) output from the regulator, the position of the permanent magnet, the amount of throttling of the exhaust valve, or the like while measuring the contact force with the use of the contact force measuring device 300 such as an electronic balance. This adjustment is made manually and time consuming, and is difficult to reproduce.

With the technique disclosed in the above U.S. Pat. No. 7,685,733, fine control of the air pressure is required to adjust a fine contact force and the contact force tends to be affected by minute pulsations of the air pressure.

The contact force of the probe can also be adjusted with electromagnets and permanent magnets, in addition to the compressed air. In this case, the electric currents supplied to the front and rear electromagnets on the probe should be controlled separately to adjust the contact force of the probe. This requires an additional device for controlling the electric currents and a heat generated by the electromagnets causes thermal expansion of the probe, so it is not suitable for a device that requires fine measurement at the micrometer or more precise level.

SUMMARY OF THE INVENTION

In view of the problems with the conventional techniques described above, an object of the present invention is to provide a contact type measurement device having a fine contact force adjustment mechanism that can automatically and precisely adjust a fine contact force with use of air pressure and a permanent magnet.

The contact type measurement device according to the present invention performs measurement with displacement of a probe, which is attached to the contact type measurement device in such a way that the central axis of the probe can be varied to any angle with respect to the direction of gravity, with a contact member attached to the front end of the probe in contact with the object to be measured. This contact type measurement device includes a probe body supporting the probe with a fluid bearing, a fluid pressure controlling unit for controlling the fluid pressure within the probe body to apply a pulling-in or pushing-out force to the probe, a distance adjusting unit having a movable part attached to the probe body, a permanent magnet attached to the movable part of the distance adjusting unit, a member attached to the rear end of the probe for generating a repulsive or attractive force with respect to the permanent magnet on the movable part, the rear end opposing the front end to which the contact member is attached, an angle calculating unit for determining the angle of the central axis of the probe with respect to the direction of gravity, a storage unit for storing data measured in advance of the relationship of the contact force of the probe to the object to be measured with the angle between the central axis of the probe and the direction of gravity, the amount of displacement of the probe, and the fluid pressure, and a contact force controlling unit for controlling the fluid pressure or the amount of displacement of the probe on the basis of the data stored in the storage unit to keep the contact force of the probe at a preset value.

The member for generating a repulsive or attractive force with respect to the permanent magnet on the movable part may be made of a magnetic metal or may be a member having a permanent magnet embedded therein.

The fluid pressure controlling unit may control a fluid pressure inside the probe body with the use of an electropneumatic regulator.

The data to be stored in the storage unit can be obtained by determining both the relationship of the contact force measured by a force sensor with the amount of displacement of the probe and the relationship of the effect of the own weight of the probe on the contact force with the angle between the central axis of the probe and the direction of gravity while the probe is moved straight along its central axis, which is oriented at 90 degrees with respect to the direction of gravity, with its contact member in contact with a force sensor having a resolution of 100 mgf or less, at a predetermined fluid pressure, and with the permanent magnet on the movable part being positioned at a predetermined position.

The contact force controlling unit may determine a fluid pressure value for keeping constant the amount of displacement of the probe at an angle determined by the angle calculating unit on the basis of the data stored in the storage unit and may control the fluid pressure controlling unit to achieve the value of the fluid pressure thus determined.

The contact force controlling unit may determine a displacement value of the probe for keeping constant the fluid pressure at an angle determined by the angle calculating unit on the basis of the data stored in the storage unit and may control the probe to move in the direction of the determined angle to achieve the displacement value thus determined.

The present invention can provide a contact type measurement device having a fine contact force adjustment mechanism capable of automatically and precisely adjusting a fine contact force with use of air pressure and a permanent magnet.

BRIEF DESCRIPTION OF THE DRAWINGS

The above and other objects and features of the present invention will become apparent from the following description of embodiments with reference to the accompanying drawings, in which.

FIGS. 5A-5C illustrate how machining is performed with a machining device mounted on a rotating axis of the machine tool by controlling the respective axes of the machine tool simultaneously so that the central axis of the tool is kept always perpendicular to the spherical surface of the workpiece;

FIGS. 6A-6C illustrate how measurement is performed by the on-machine measuring device mounted on the same rotating axis as the machining device after the machining in FIGS. 5A-5C is performed, by simultaneously controlling the respective axes (X-, Y-, Z-, B-, and C-axes in FIG. 1) of the machine tool according to a measurement program, which is prepared on the basis of the machining program, to keep the central axis of the probe perpendicular to the spherical surface of the workpiece;

FIG. 7 illustrates a contact type measurement device according to an embodiment of the present invention, which has an electropneumatic regulator added to a conventional contact type measurement device (shown in FIG. 11) that can finely adjust the contact force of the probe, to adjust the contact force of the probe by displacing the probe of the on-machine measuring device and by controlling the electropneumatic regulator by the numerical controller and store the current amount of displacement of the probe and the corresponding contact force simultaneously in an external storage unit of a personal computer or the like.

FIG. 11 shows an example of conventional on-machine measurement device that can finely adjust the contact force of the probe to the surface to be measured.

DETAILED DESCRIPTION OF THE PREFERRED EMBODIMENTS

Figure 1:
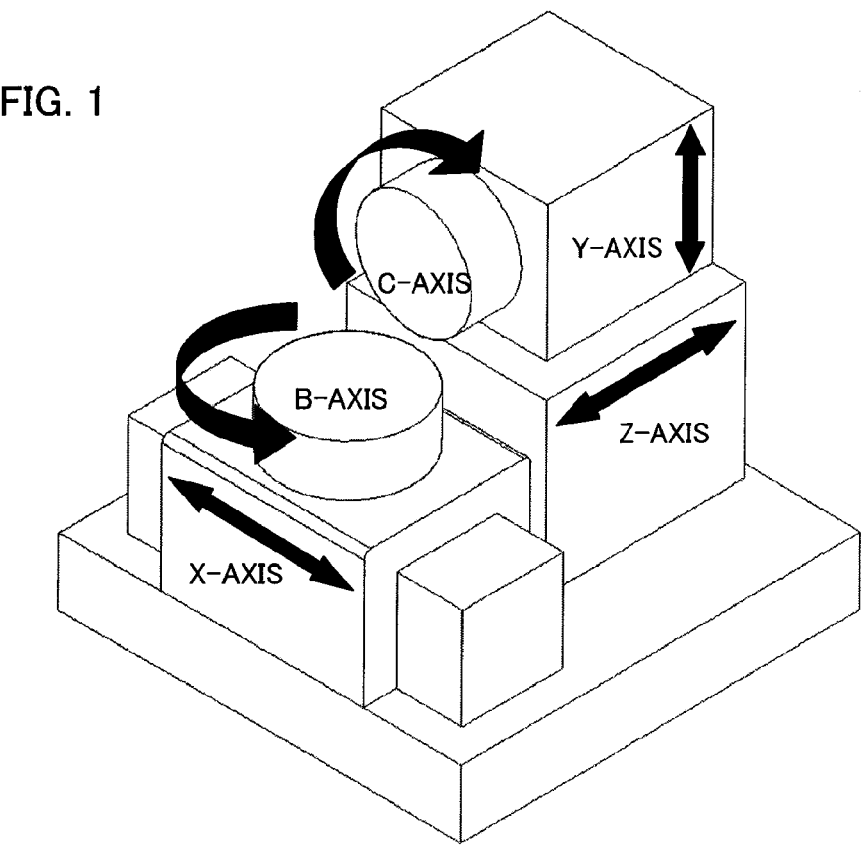
FIG. 1 illustrates main components of a machine tool that can control five axes including three linear motion axis (X-, Y-, and Z-axes) and two rotating axes (B- and C-axes)

FIG. 1 illustrates main components of a machine tool that can control fives axes including three linear motion axes, X-, Y-, and Z-axes, and two rotating axes, B- and C-axes. B-axis is disposed on X-axis and C-axis is disposed on Y-axis. This machine tool is controlled by a numerical controller (not shown).

Figure 2:
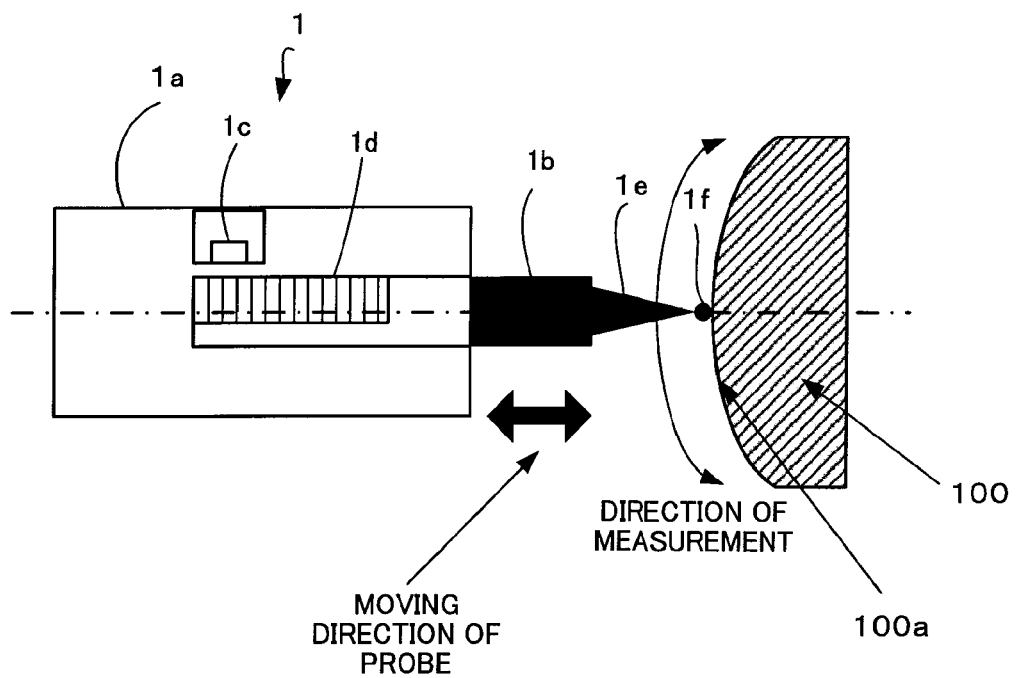
FIG. 2 illustrates an example of an on-machine measuring device (contact type measurement device) mounted on the machine tool in FIG. 1.

FIG. 2 illustrates an example of a contact type measurement device employed as the on-machine measuring device 1. The on-machine measuring device 1 is mounted on a machine tool such as shown in FIG. 1 and can perform measurement on site.

As shown in FIG. 2, the on-machine measuring device 1 includes a probe body 1a and a probe 1b. The probe 1b is a movable part built in the probe body 1a and supported by a fluid bearing. Being supported by the fluid bearing, the probe 1b can move along its central axis with no or negligible friction. An air bearing, for example, can be used as the fluid bearing.

A measuring shaft 1e, which is a thin stick-like member, is fixed to the front end of the probe 1b. A spherical measuring member 1f is attached to the front end of the measuring shaft 1e. To measure the shape of the object to be measured, the spherical measuring member 1f is brought into contact with the surface to be measured 100a of the object to be measured 100. As in conventional contact type measurement devices, a spherical ruby ball is used as the spherical measuring member 1f to decrease the coefficient of friction with the surface to be measured 100a and prevent wear.

The on-machine measuring device 1 has a laser head 1c and a linear scale 1d as members for detecting the movement and displacement of the probe 1b. The linear scale 1d is disposed within the probe body 1a, facing the probe 1b. The laser head 1c is also disposed within the probe body 1a, facing the linear scale 1d. Such a movement and displacement detecting means equipped with the laser head 1c and the linear scale 1d is a well-known means for highly accurate position detection.

As shown in FIG. 2, the displacement of the probe 1b is detected by the movement and displacement detecting means including the laser head 1c and linear scale 1d when the on-machine measuring device 1 is moved along the surface to be measured 100a of the object to be measured 100. The movement and displacement detecting means outputs a movement and displacement detection signal indicating the displacement of the probe 1b. The movement and displacement detection signal is input as a measurement signal ipf from the on-machine measuring device 1 to a personal computer 11 described later and is stored as the position information of the probe 1b output from the on-machine measuring device 1.

A machine tool system can be configured by incorporating the contact type measurement device described with reference to FIG. 2 as the on-machine measuring device for the machine tool.

This machine tool system includes a numerical controller and the on-machine measuring device having a probe equipped with a measuring member. The surface shape of the object to be measured is measured by transferring an axis position detection signal output from a position detector for detecting the position of the movable axis of the machine tool including one or more linear motion axes and one or more rotating axes, as well as a measurement signal output from the on-machine measuring device, to an external device. The numerical controller receives the axis position detection signal and the measurement signal via interfaces. These interfaces are incorporated in amplifiers for driving the motors associated with the movable axes of the machine tool. The numerical controller receives the measurement signal from the on-machine measuring device via an interface incorporated in an amplifier to which the motors for driving the machine tool is not connected. The on-machine measuring device, which is a contact type measurement device mounted on the rotating axis for performing measurement with displacement of the probe with the measuring member being in contact with the surface of the object to be measured, has means for adjusting the contact force by adjusting the air pressure applied to the probe and the distance between the probe and the permanent magnet. The air pressure applied to the probe is controlled by the numerical controller.

Figure 3:
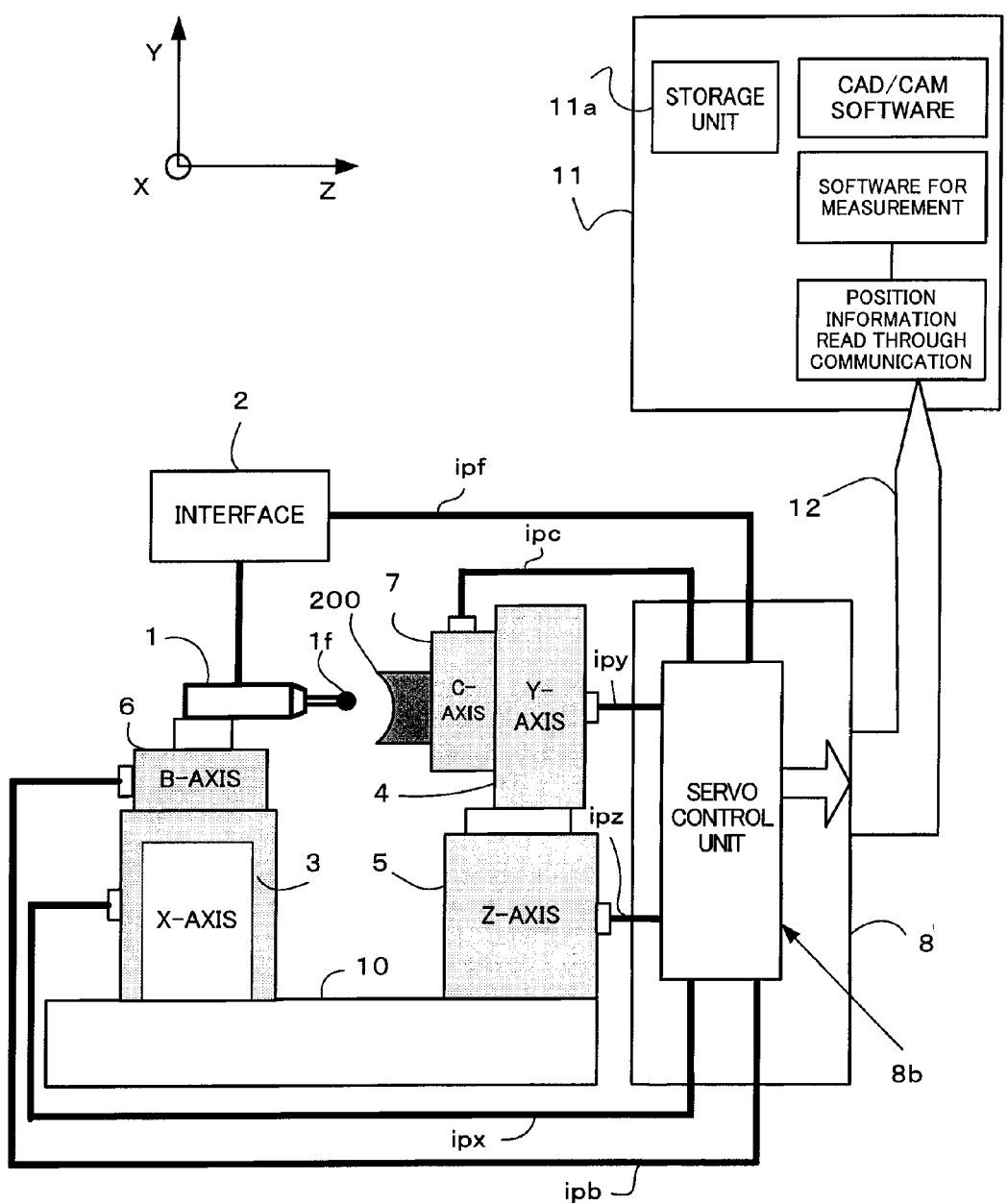
FIG. 3 illustrates a system including a machine tool equipped with an on-machine measuring device and a numerical controller for controlling the machine tool.

FIG. 3 illustrates a system including a machine tool equipped with the on-machine measuring device described above and a numerical controller for controlling the machine tool.

As shown in FIG. 3, the measurement signal ipf from the on-machine measuring device 1 is input to the personal computer 11 through the numerical controller 8. In the example in FIG. 3, since B-axis (rotating axis on which the on-machine measuring device 1 is mounted) shares one and the same interface with the X-, Y-, Z- and C-axes in the machine tool, the position detection signals of the X-, Y-, Z-, B- and C-axes and the measurement signal from the on-machine measuring device 1 can be easily synchronized and input to the numerical controller 8.

The numerical controller 8, which is a device for controlling the actuation of the machine tool for machining a workpiece according to a machining program, has an arithmetic unit, storage unit, display unit, or the like as usual. Since the interfaces incorporated in the amplifiers for driving the motors associated with the respective axes of the machine tool are used as the interface 2 for the on-machine measuring device 1, the position detection signals of the respective axes of the machine tool and the measurement signal from the on-machine measuring device can be easily synchronized and input to the numerical controller 8. The synchronized and input signals are stored as position information in a storage unit (not shown) in the numerical controller 8.

The numerical controller 8 stores, through a LAN communication via the Ethernet® 12 to an external device such as the personal computer 11, for example, the position information from the respective axes of the machine tool and the measurement information from the on-machine measuring device 1 in a storage unit 11a connected to the personal computer 11. The personal computer 11 stores the position information and measurement information from the numerical controller 8 in the storage unit 11a.

The personal computer 11, which has software for measurement stored therein, can perform necessary arithmetic processing, such as measurement of the shape of an object to be machined, using the position information and measurement information read through the numerical controller 8. The arithmetic processing such as shape measurement is similar to the one in the conventional techniques. The personal computer 11 also stores NC program for measurement, NC programs for machining, and NC programs for corrective machining. These programs are also conventionally known programs.

Figure 4:
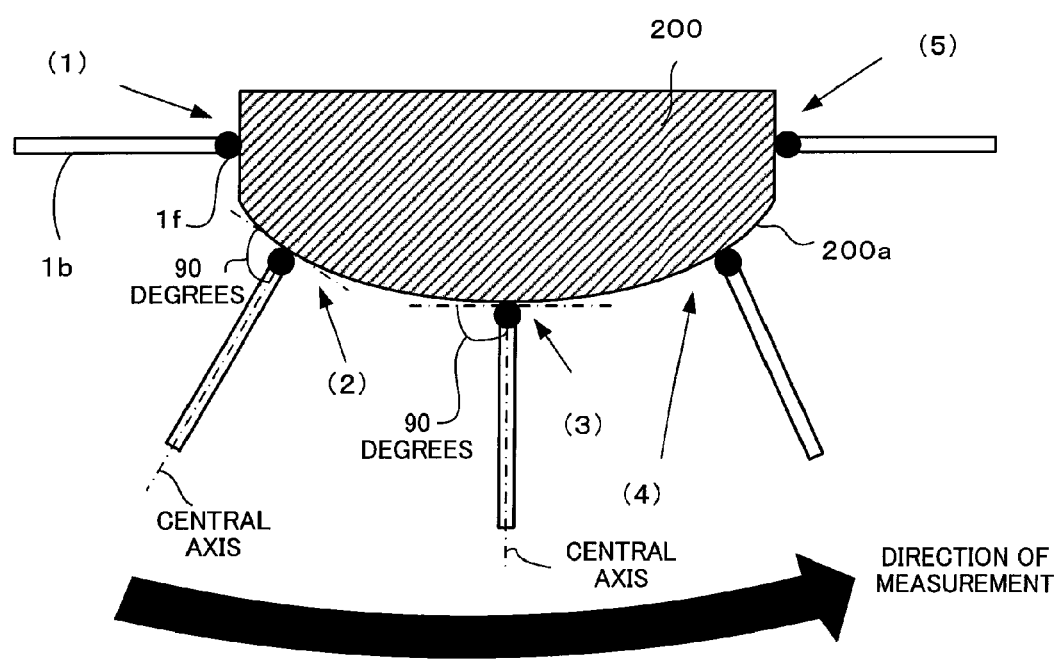
FIG. 4 illustrates how on-machine measurement is performed with displacement of a probe, which is a movable axis of the on-machine measuring device mounted on a rotating axis of the machine tool, with a ruby ball, which is a spherical measuring member, in contact with a curved surface of the workpiece and causing the on-machine measurement device to scan by simultaneously controlling the axes of the machine tool.

FIG. 4 illustrates how on-machine measurement is performed with displacement of a probe, which is a movable axis of the on-machine measuring device mounted on a rotating axis of the machine tool, by simultaneously controlling the respective axes of the machine tool to cause the on-machine measuring device to scan with a ruby ball, which is a spherical measuring member, in contact with the curved surface of the workpiece.

In this on-machine measurement, the axes of the machine tool are simultaneously controlled to keep the central axis of the probe 1b always perpendicular to the surface to be machined 200a of the workpiece 200. Since, ideally, only the point at which the central axis of the probe 1b meets the tip of the spherical measuring member 1f is brought into contact with the surface to be machined of the workpiece, measurement can be performed at an angle of 90 degrees or more, which is impossible with the conventional techniques. Since measurement is always performed at a single point (point at which the central axis of the probe 1b meets the tip of the spherical measuring member 1f), shape error of the spherical measuring member 1f can be minimized.

Referring to FIGS. 5A-5C and FIGS. 6A-6C, there will now be described how machining and measurement are performed with the on-machine measuring device and the machining tool mounted on the same rotating axis.

FIGS. 5A-5C illustrate how machining is performed by a machining device mounted on the rotating axis of the machine tool while the respective axes of the machine tool are simultaneously controlled to keep the central axis of the tool always perpendicular to the spherical surface of the workpiece 200.

In case where the on-machine measuring device 1 and the machining device 20 such as a spindle are mounted on the same rotating axis, the machining device 20 performs machining while the axes of the machine tool are simultaneously controlled to keep the central axis of the tool always perpendicular to the spherical surface of the workpiece. Conventionally, machine tools have been instructed to keep the central axis of the tool perpendicular to the surface to be machined of the workpiece and machining programs for use in such machining have been used. A conventional machining program for machining in the direction perpendicular to the surface of the workpiece 200 can therefore be used as the NC machining program for the machine tool shown in FIG. 3.

FIGS. 6A-6C illustrate how measurement is performed, after the machining shown in FIGS. 5A-5C is performed, by the on-machine measuring device mounted on the same rotating axis as the machining device, by controlling the respective axes (X-, Y-, Z-, B-, and C-axes in FIG. 1) of the machine tool simultaneously according to a measurement program prepared on the basis of the machining program to keep the central axis of the probe 1b always perpendicular to the spherical surface of the workpiece 200. When the machining program is utilized for on-machine measurement by the on-machine measuring device 1, the amount of offset from the blade edge of the machining tool to the point at which the central axis of the probe 1b meets the spherical measuring member 1f is reflected on a measurement program to be prepared. Since the machining program can be utilized in this way to prepare the measurement program, the measurement program need not be created from scratch.

Figure 7:
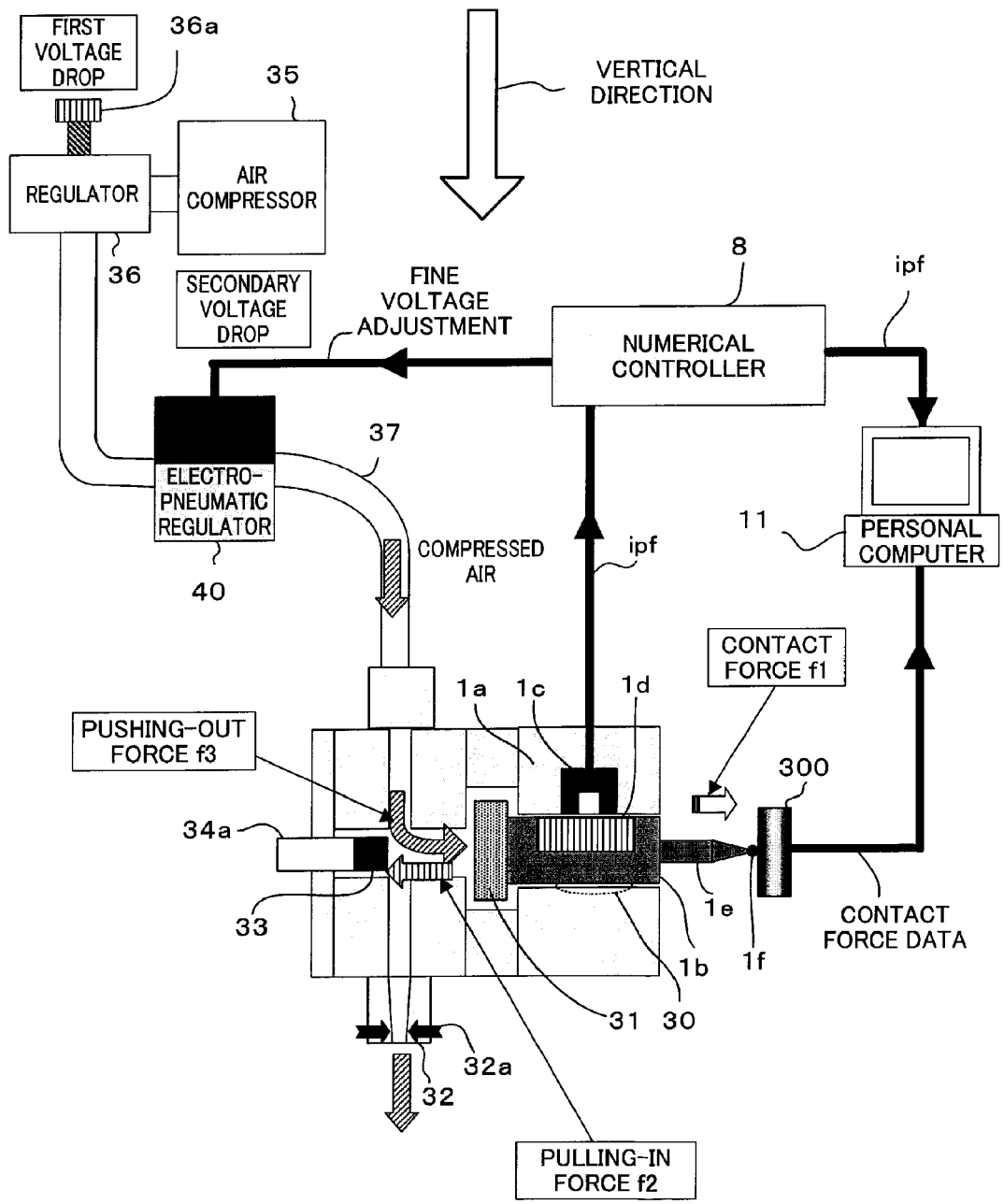

FIG. 7 shows an example in which an electropneumatic regulator is added to the conventional contact type measurement device (FIG. 11) disclosed in the above U.S. 2009/0235397 A1 for fine adjustment of the contact force.

In the example in FIG. 7, at a certain regulator pressure, with the permanent magnet positioned at a certain position, with a certain amount of throttling of the exhaust valve, and with the central axis of the probe being kept perpendicular to the direction of gravity without exerting any effect of gravity on the contact force, the contact force of the probe is varied by displacing the probe of the on-machine measuring device connected to the numerical controller and by controlling the electropneumatic regulator by the numerical controller, and the current amount of displacement of the probe and the corresponding contact force are stored simultaneously in the external storage unit of a personal computer or the like.

The compressed air from an air compressor 35 undergoes the primary pressure drop through the regulator 36 having a means for adjusting supplied air pressure 36a, and then undergoes the secondary pressure drop through an electropneumatic regulator 40 before being supplied to the probe body 1a of the on-machine measuring device 1. The pressure of the compressed air discharged from the regulator 36 is fixed. The electropneumatic regulator 40 is a known device that converts an electric signal to an air pressure and accurately controls the air flow rate.

The compressed air supplied to the probe body 1a applies a force to a magnetic material 31 attached to the probe 1b to push the probe 1b out of the probe body 1a (pushing-out force f3). The compressed air supplied to the probe body 1a is discharged out of the probe body 1a through an exhaust port 32, a fluid bearing surface 30, and the like. The amount of throttling of the exhaust valve 32a attached to the exhaust port 32 is fixed. A fluid for bearing may be supplied from a bearing fluid supplying means (not shown) to the fluid bearing surface 30.

The magnetic material 31 attached to the rear end of the probe 1b may be made of iron or other metal, or a permanent magnet may be used instead. When a permanent magnet is used for the magnetic material 31, its polarities should be selected so that an attractive force is exerted between the permanent magnet and another permanent magnet 33 described below. A micrometer 34 (see FIG. 11) equipped with a spindle 34a (movable part) is attached to the probe body 1a and the permanent magnet 33 is attached to the front end of the spindle 34a, facing the magnetic material 31. The micrometer 34, which is, for example, an extremely precise screw pitch gauge, can accurately measure the position of the permanent magnet 33 with respect to the probe 1b to accurately adjust the distance between the magnetic material 31 and the permanent magnet 33. This enables the attractive force between the permanent magnet 33 and the magnetic material 31 to be adjusted with a high degree of accuracy.

The magnetic material 31 attached to the probe 1b is subjected to both the pushing-out force f3 caused by the compressed air and a pulling-in force f2 which is an attractive force exerted between the magnetic material 31 and the permanent magnet 33 attached to the front end of the spindle of the micrometer 34. The pushing-out force f3 is a force pushing the probe 1b out of the probe body 1a, while the pulling-in force f2 is a force pulling the probe 1b into the probe body 1a. The contact force f1 exerted by the spherical measuring member 1f attached to the measuring shaft 1e of the probe 1b on the contact force measuring device 300 can therefore be expressed by this relational expression: $f1=f3-f2$. Using this relational expression, the contact force f1 of the spherical measuring member 1f can be adjusted as desired by adjusting the amounts and directions of the pulling-in force f2 and pushing-out force f3.

The contact force f1 of the probe 1b to the surface to be measured 300a of the contact force measuring device 300 can be finely adjusted in the probe body 1a having the mechanical wear-free probe 1b supported by the fluid bearing (fluid bearing surface 30), with the spherical measuring member 1f attached to the front end of the measuring shaft 1e in contact with the contact force measuring device 300, by adjusting the pressure of the air supplied to the probe 1b with the regulator 36 and the exhaust valve 32a and by adjusting the attractive force of the permanent magnet 33 to the magnetic material 31. A force sensor or an electronic balance, for example, may be used as the contact force measuring device 300.

The probe 1b is oriented in the direction perpendicular to the vertical direction (direction of gravity) so that the contact force f1 between the probe 1b attached to the on-machine measuring device 1 and the measured object is not affected by the gravitational force. The contact force of the probe 1b is measured by bringing the spherical measuring member 1f fixed to the front end of the measuring shaft 1e of the probe 1b into contact with the surface to be measured 300a of the contact force measuring device 300. The contact force data of the contact force f1 thus measured is output from the contact force measuring device 300 to the personal computer 11.

The numerical controller 8 for controlling the machine tool issues a fine voltage adjustment command to the electropneumatic regulator 40 to finely adjust the pressure of the air output from the electropneumatic regulator 40 and obtains and stores the relationship between the current amount of displacement of the probe 1b and the corresponding contact force f1 simultaneously in the storage unit of the personal computer 11. To control the pressure of the air output from the electropneumatic regulator 40 connected to the numerical controller 8, the numerical controller 8 converts the data stored in the storage unit of the numerical controller to a voltage to be issued as the command to the electropneumatic regulator 40 on the basis of macro variables or depending on the change in coordinates of the rotating axis of the machine tool on which the on-machine measuring device is mounted. The compressed air undergoes the secondary pressure drop through the electropneumatic regulator 40 after the primary pressure drop through the regulator 36. Since the compressed air undergoes the pressure drop in two stages, the air pressure can be finely adjusted and its pulsation can be minimized.

As shown in FIG. 7, the displacement of the probe 1b of the on-machine measuring device 1 is input as the position detection signal (measurement signal ipf) to the numerical controller 8 and then input from the numerical controller 8 to the personal computer 11 to be stored there.

Figure 8:
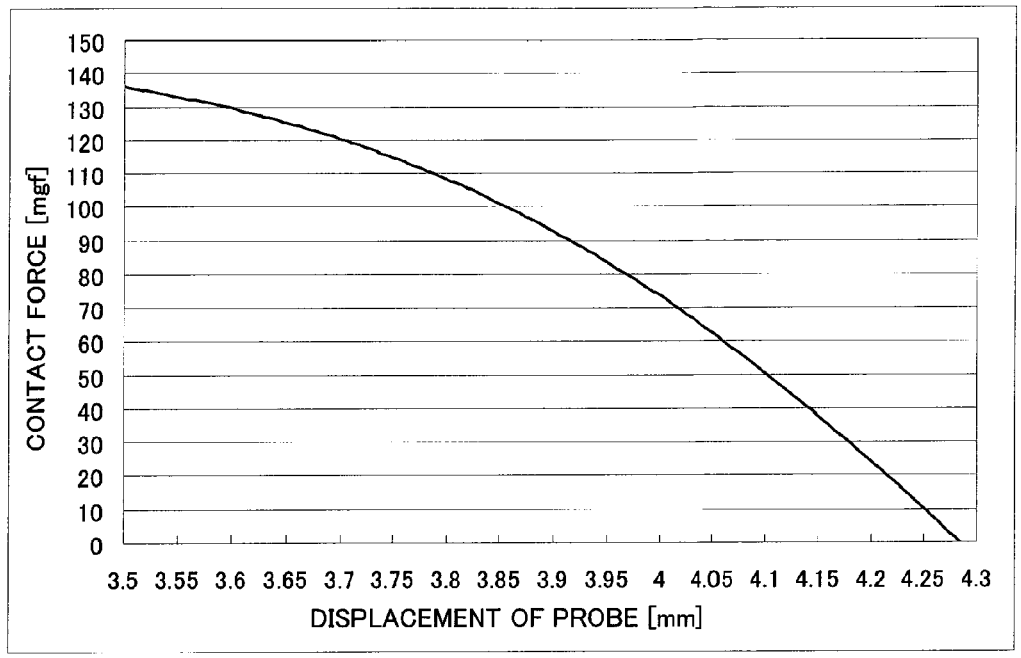
FIG. 8 is a graph showing that an apparent relationship between the amount of displacement of the probe and the contact force between the probe and the object to be measured is obtained as a result of storing position detection signals from the on-machine measuring device in FIG. 7 via the numerical controller to the personal computer.

FIG. 8 is a graph showing that the relationship between the amount of displacement of the probe 1b and the contact force of the probe b with respect to the object to be measured becomes apparent as a result of inputting and storing the position detection signals from the on-machine measuring device 1 to the personal computer 11 through the numerical controller 8 as shown in FIG. 7. The horizontal axis indicates the amount of displacement of the probe 1b and the vertical axis indicates the contact force. The displacement of the probe 1b indicates the distance of the probe 1b pulled into the probe body 1a of the on-machine measuring device 1 from the outermost position (reference position: 0 [mm]) of the probe 1b pushed out of the probe body 1a of the on-machine measuring device.

The graph in FIG. 8 is obtained as follows. A predetermined fluid pressure is applied to the on-machine measuring device 1 in FIG. 7. The permanent magnet 33 attached to the movable spindle 34a is positioned at a predetermined position. The spherical measuring member 1f attached to the measuring shaft 1e is brought into contact with the contact force measuring device 300 having a resolution of 100 mgf or less. The relationship between the amount of displacement of the probe 1b and the corresponding contact force to the contact force measuring device 300 is determined while the probe 1b is moved straight along its central axis so that the central axis is kept rectangular (90 degrees) to the direction of gravity (vertical direction), or the probe 1b is oriented in a horizontal direction. The effect of the own weight of the probe 1b on the contact force is then determined from the angle of the central axis of the probe 1b with respect to the direction of gravity.

The measurement of the contact force with the contact force measuring device 300 is required only once when the probe 1b is horizontal (i.e., the direction of the central axis of the probe 1b is at 90 degrees with respect to the direction of gravity) and not affected by the gravitational force. The effect of the own weight of the probe 1b, which is known information, on the contact force is determined by equation (1) described later. From these two data, the required amount of displacement of the probe 1b can be determined depending on the angle of the central axis of the probe 1b with respect to the vertical direction (direction of gravity) shown in FIG. 8.

Figure 9:
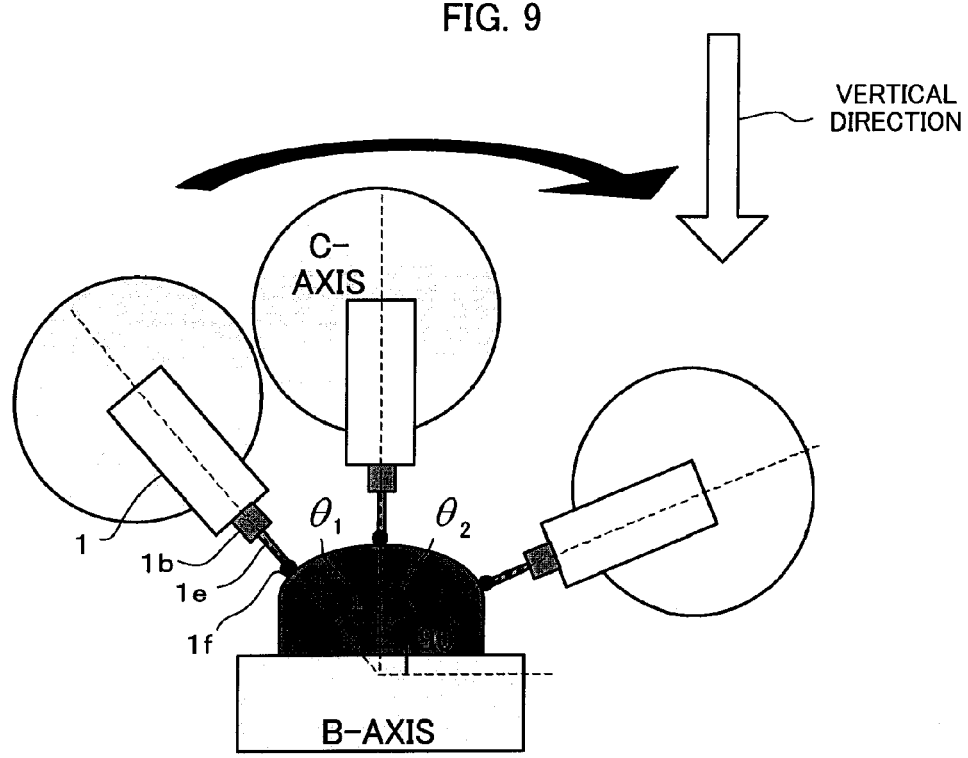
FIG. 9 illustrates how measurement is performed by the on-machine measuring device that is mounted on C-axis of the machine tool in FIG. 1 and controlled to keep the central axis of the probe perpendicular to the surface of the object to be measured.

FIG. 9 illustrates how measurement is performed with the on-machine measuring device that is mounted on C-axis of the machine tool in FIG. 1 and controlled to keep the central axis of the probe always perpendicular to the surface of the object to be measured. In the contact measurement shown in FIG. 9, the effect of the own weight of the probe 1b on the contact force f1 (in the direction perpendicular to the surface to be measured) varies with the rotation angle of C-axis. The rotation angle of C-axis with respect to the direction of gravity can be calculated by the numerical controller 8 described above.

It is assumed here that the pushing-out force of the probe 1b caused by the air pressure is $F_A$, the pulling-in force caused by the permanent magnet is $F_{MG}$, the own weight of the probe 1b is $M_{PR}$, the rotation angle of the probe 1b with respect to the central axis of the probe 1b oriented in the vertical direction is $\theta$, the effect of the own weight of the probe 1b on the contact force is $F_{PR}(\theta)$, the total pushing-out force is $F_{PS}$, and the total probe contact force is $F_T$. Here, the "own weight of the probe 1b" is a total weight of the probe 1b including the probe 1b, linear scale 1d, measuring shaft 1e, and spherical measuring member 1f in FIG. 2.

Using the variables defined above, the contact force varying with the rotation angle of the rotating axis on which the on-machine measuring device 1 is mounted can be expressed using relational expressions (1)-(3) below. The variation in contact forces can be readily understood with reference to FIG. 9. In FIG. 9, it is assumed that $\theta_1$ is less than $\theta_2$.

Equation (1) expresses the effect of the own weight of the probe on the contact force. Equation (2) describes the effects on the effect $F_{PR}(\theta)$ of the own weight of the probe on the contact force when the rotation angles of the probe 1b are $\theta_1$ and $\theta_2$. The effect $F_{PR}(\theta)$ of the own weight of the probe on the contact force is maximized when $\theta$ is 0 degrees.

$$F_{PR}(\theta) = M_{PR} \times \cos\theta \tag{1}$$

$$\text{MAX}.F_{PR} \equiv F_{PR}(\theta) > F_{PR}(\theta_1) > F_{PR}(\theta_2) \tag{2}$$

The total contact force $F_T$ of the probe 1b can be expressed by equation (3) below.

$$F_T = F_{PS} - F_{MG} = [F_A + F_{PR}(\theta)] - F_{MG} \tag{3}$$

It is apparent from equation (3) above that the effect of the own weight of the probe on the contact force can be eliminated from the total contact force $F_T$ of the probe 1b if the effect $F_{PR}(\theta)$ of the own weight of the probe on the contact force is cancelled out by adjusting the pressure of the compressed air with the electropneumatic regulator 40. The required amount of adjustment $\Delta F_{EP}(\theta)$ by the electropneumatic regulator 40 is expressed by equation (4) below.

$$\Delta F_{EP}(\theta) = M_{PR} \times \cos\theta \tag{4}$$

Then, the total contact force $F_T$ of the probe can be expressed by equation (5) below.

$$F_T = [F_A + F_{PR}(\theta)] - F_{MG} - \Delta F_{EP}(\theta) = F_A - F_{MG} \tag{5}$$

As described above, the effect of the own weight of the probe can always be cancelled out if the voltage to the electropneumatic regulator 40 is adjusted by the numerical controller 8 depending on the rotation angle of the rotating axis on which the on-machine measuring device 1 is mounted.

When the own weight of the probe 1b exerts an effect on the contact force of the probe 1b mounted on the on-machine measuring device 1 to the object to be measured and this effect varies with the angle of the rotating axis on which the on-machine measuring device 1 is mounted, the voltage to the electropneumatic regulator 40 is controlled by the numerical controller 8 so as to cancel out the amount of variation $\Delta F_{EP}(\theta)$ due to the angle variation (0→θ) of the rotating shaft calculated by the numerical controller 8.

In FIG. 7, to cancel out an increased effect of the own weight of the probe 1b on the contact force, a voltage command issued from the numerical controller 8 to the electropneumatic regulator 40 is finely adjusted depending on the angle θ to reduce the voltage and thus reduce the pressure of the compressed air supplied from the electropneumatic regulator 40 through a compressed air feeding line 37 to the on-machine measuring device 1.

Figure 10:
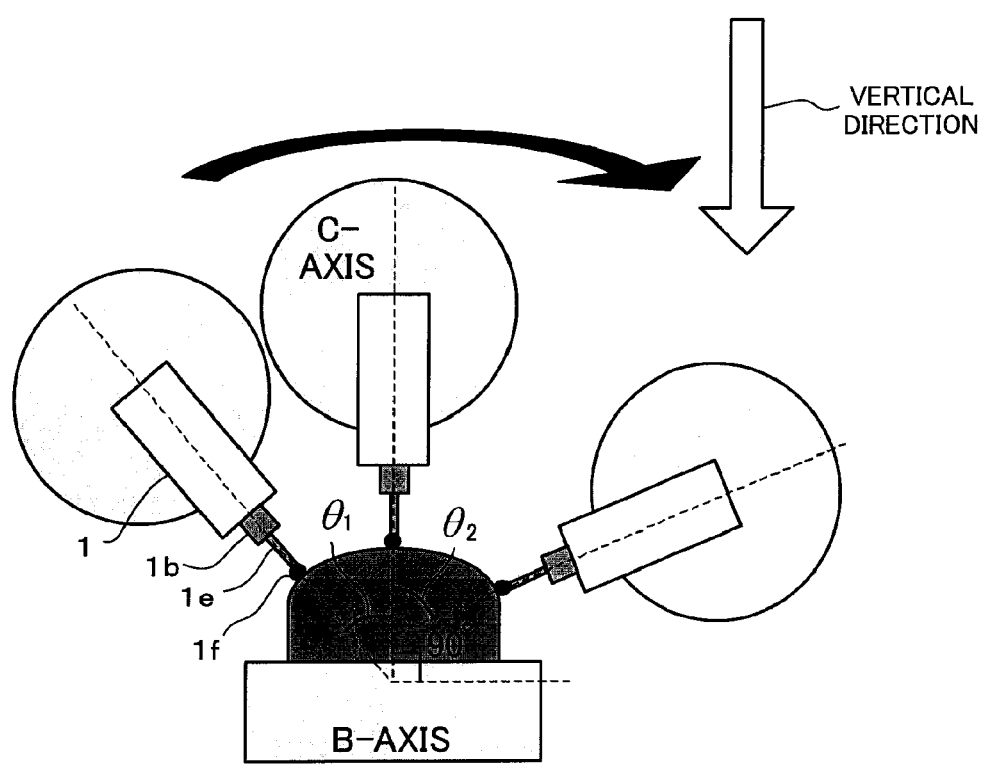
FIG. 10 illustrates how the effect of the own weight of the probe on the contact force is eliminated when the output (pressure of the compressed air) from the electropneumatic regulator of the on-machine measuring device in FIG. 7 is constant.

Referring to FIG. 10, there will now be described how the effect of the own weight of the probe 1b on the contact force is eliminated when the pressure of the compressed air from the electropneumatic regulator 40 shown in FIG. 7 is constant (i.e., the voltage command from the numerical controller 8 to the electropneumatic regulator 40 is fixed).

This method is characterized in that, when the own weight of the probe 1b exerts an effect on the contact force of the probe 1b and this effect varies with the angle of the rotating axis on which the on-machine measuring device 1 is mounted, the numerical controller 8 automatically controls the amount of displacement of the probe 1b and thus cancel out the effect of the own weight of the probe 1b on the contact force. More specifically, on the basis of the relationship between the amount of displacement of the probe 1b and the corresponding contact force measured by the contact force measuring device 300, the numerical controller 8 automatically controls the amount of displacement of the probe 1b with the spherical measuring member 1f in contact with the surface of the object to be measured, to cancel out the variation in contact force due to the angle variation calculated by the numerical controller 8.

FIG. 10 illustrates how the effect of the own weight of the probe is always cancelled out by pulling the probe into the on-machine measuring device by increasing the magnetic force, with the output from the electropneumatic regulator being fixed, when the effect of the own weight of the probe increases with a varied rotation angle of C-axis of the machine tool shown in FIG. 1 on which the on-machine measuring device is mounted and controlled to keep the central axis of the probe of the on-machine measuring device always perpendicular to the surface of the object to be measured.

Here, assuming that the increase in pulling-in force due to an increased magnetic force for pulling the probe 1b into the on-machine measuring device 1 by displacement $\Delta PR$ ($\theta$) at rotation angle $\theta$ of the probe 1b is $\Delta F_{\Delta PR}(\theta)$, the relationship expressed by equation (6) is established.

$$\Delta F_{\Delta PR}(\theta) = M_{PR} \times \cos \theta \quad (6)$$

The total contact force $F_T$ of the probe at this moment can be expressed as in equation (7).

$$F_T = [F_A + F_{PR}(\theta)] - F_{MG} - \Delta F_{\Delta PR}(\theta) = F_A - F_{MG} \quad (7)$$

The amount of displacement for pulling the probe 1b into the on-machine measuring device 1 (probe body 1a) to cancel out the effect of the own weight of the probe 1b at a certain rotation angle is determined from the relationship between the amount of displacement and the corresponding contact force of the probe shown in FIG. 8. As the probe 1b is pulled into the probe body 1a and the distance between the magnetic material 31 and the permanent magnet 33 is reduced, the magnetic force increases and thus the pulling-in force increases, thereby cancelling out the own weight of the probe 1b.

The relationship between the angle variation (0→$\theta$) of the rotating axis on which the on-machine measuring device is mounted and the corresponding amount of displacement of the probe (the amount of pulling the probe 1b into the probe body 1) is set and stored in advance in the numerical controller 8. According to this relationship stored in the numerical controller 8, the amount of displacement of the probe (the amount of pulling the probe 1b into the probe body 1) corresponding to the angle variation of the rotating axis on which the on-machine measuring device is mounted is automatically determined and is reflected by the numerical controller 8 when controlling the axis of the machine tool on which the on-machine measuring device 1 is mounted.

While the on-machine measuring device 1 follows the surface to be measured (the displacement of the probe becomes zero on an ideal shape), the above method using the measurement device according to the present invention displaces the probe 1b along its central axis to cancel out the own weight of the probe 1b, but similar data is obtained as if the on-machine measuring device 1 follows the surface to be measured, because the amount of displacement of the probe (amount of pulling the probe 1b into the probe body 1) is stored at the same time and is subtracted from the actual measurement data of the surface after its measurement. Alternatively, a measurement program may be prepared by reflecting the amount of displacement of the probe corresponding to the rotation angle of the probe on the program (for example, the coordinate system may be reconfigured by taking into account the amount of pulling in the probe). The above method is applicable to both a machine tool system equipped with an electropneumatic regulator such as shown in FIG. 7 as well as a machine tool system not equipped with an electropneumatic regulator such as shown in FIG. 11.

As described above, according to the embodiment of the present invention (see FIG. 7), the electropneumatic regulator 40 is connected downstream of the regulator 36 for adjusting the air pressure and is controlled by the numerical controller 8. The pressure of the compressed air output from the compressor 35 is reduced by the regulator 36 and then further reduced by the electropneumatic regulator 40 located downstream, so air pulsation can be minimized and variation in contact forces due to air pressure variations can be eliminated as much as possible. The contact force can be adjusted as desired within the measurement program by linking the control of the electropneumatic regulator 40 with the macro variables for the numerical controller 8 or with the coordinates of the rotating axis. When the on-machine measuring device is mounted in the direction in which the effect of gravity is exerted in rotation measurement, the output from the electropneumatic regulator 40 can be varied at each angle and thus the variation in the effect of the gravitational force due to angle variations can be cancelled out.

With the permanent magnet 33 positioned at a certain position and with the pressure of the compressed air being kept constant, the contact force is measured by the contact force measuring device 300 with the probe 1b of the on-machine measuring device 1 pressed against the contact force measuring device 300. At the same time, the amount of displacement of the probe corresponding to the contact force being measured is measured and its data is plotted on a graph. As the probe 1b is pushed into the probe body, the distance between the magnetic material 31 and the permanent magnet 33 (or, between magnet and magnet) is reduced, varying the magnetic force. For example, as the magnetic material 31 is pushed toward the permanent magnet 33, the contact force is reduced and the magnetic force starts to exceed the air pressure at a certain amount of displacement (contact force being 0). Once the relationship between the displacement of the probe pushed into the probe body and the corresponding contact force is plotted on a graph, the contact force can be finely adjusted up to zero depending on the amount of displacement of the probe 1b pushed into the probe body.

For rotation measurement is performed under the effect of gravity using the on-machine measuring device 1, which is recognized as an axis by the numerical controller 8, if gravity variations corresponding to the angles of the rotating axis and the relationship plotted on the graph are input to the numerical controller in advance, the amount of displacement for pulling or pushing the probe in or out of the probe body can be automatically controlled depending on rotation angle variations and the contact force can be kept always constant during continuous scan measurement.

The invention claimed is:

1. A contact type measurement device which includes at least three linear motion axes and at least two rotating axes and in which a probe is attached to any one of the rotary axes with an arbitrary angle between the central axis of the probe and the direction of gravity, those at least three linear motion axes and at least two rotating axes are controlled according to a measurement program to move the relative position of the contact member attached to the probe with respect to the position on the surface of an object to be measured so that the central axis of the probe is kept perpendicular to the surface of the object to be measured, with the contact member in contact with the surface of the object to be measured, and measurement of the shape of the object to be measured is performed using displacement of the probe, said contact type measurement device comprising:

a probe body supporting the probe with a fluid bearing;

a fluid pressure controlling unit for controlling a fluid pressure inside the probe body to apply a pulling-in or pushing-out force to the probe;

a distance adjusting unit having a movable part attached to the probe body;

a permanent magnet attached to the movable part of the distance adjusting unit;

a member attached to a second end of the probe for generating a repulsive or attractive force with respect to the permanent magnet on the movable part, the second end opposing the first end to which the contact member is attached;

an angle calculating unit for determining an angle of the central axis of the probe with respect to the direction of gravity;

a storage unit for storing previously-measured data on a relationship of the contact force of the probe to the object to be measured with an angle between the central axis of the probe and the direction of gravity, amount of displacement of the probe, and the fluid pressure; and a contact force controlling unit for obtaining the value of fluid pressure for canceling the variation in contact forces due to the own weight of the probe from an angle determined by the angle calculating unit on the basis of the data stored in the storage unit and controlling the fluid pressure controlling unit so that the obtained value of fluid pressure is achieved, or obtaining a displacement value of the probe for canceling the variation in contact forces due to the own weight of the probe when the fluid pressure is constant, from an angle determined by the angle calculating unit on the basis of the data stored in the storage unit and controlling the probe to move in the direction of the determined angle so that the obtained displacement value of the probe is achieved, wherein the variation in the effect of the gravitation force due to variation in the angle of the probe is cancelled out so that the contact force of the probe to the surface of the object to be measured is kept at a preset value.

2. The contact type measurement device according to claim 1, wherein the member is a member having a permanent magnet or a magnetic metal embedded therein.

3. The contact type measurement device according to claim 2, wherein the data to be stored in the storage unit is obtained by determining a relationship of the contact force measured by a force sensor, the force sensor having a resolution of 100 mgf or less, with the amount of displacement of the probe and a relationship of the effect of the own weight of the probe on the contact force with an angle between the central axis of the probe and the direction of gravity, while the probe is being moved straight along the central axis of the probe with the contact member in contact with the force sensor at a predetermined fluid pressure, with the permanent magnet on the movable part positioned at a predetermined position, and with the angle between the central axis of the probe and the direction of gravity set to 90 degrees.

4. The contact type measurement device according to claim 1, wherein the data to be stored in the storage unit is obtained by determining a relationship of the contact force measured by a force sensor, the force sensor having a resolution of 100 mgf or less, with the amount of displacement of the probe and a relationship of the effect of the own weight of the probe on the contact force with an angle between the central axis of the probe and the direction of gravity, while the probe is being moved straight along the central axis of the probe with the contact member in contact with the force sensor at a predetermined fluid pressure, with the permanent magnet on the movable part positioned at a predetermined position, and with the angle between the central axis of the probe and the direction of gravity set to 90 degrees.

* * * * *